United States Patent [19]

Zweigle

[11] 4,329,451

[45] May 11, 1982

[54] PREPARING AN AQUEOUS DISPERSION OF COLLOIDAL SIZE PARTICLES OF A WATER-INSOLUBLE POLYSACCHARIDE DERIVATIVE

[75] Inventor: Maurice L. Zweigle, Midland, Mich.

[73] Assignee: The Dow Chemical Company, Midland, Mich.

[21] Appl. No.: 202,915

[22] Filed: Nov. 3, 1980

[51] Int. Cl.$^3$ ............................................. C08B 3/22
[52] U.S. Cl. ........................................ 536/77; 536/86
[58] Field of Search ................................... 536/77, 86

[56] References Cited

U.S. PATENT DOCUMENTS

| | | | |
|---|---|---|---|
| 2,326,539 | 8/1943 | Irany | 536/85 |
| 3,251,824 | 5/1966 | Battista | 536/77 |
| 3,424,744 | 1/1969 | Mitchell et al. | 536/86 |
| 4,044,198 | 8/1977 | Kostrzewa et al. | 536/86 |
| 4,076,935 | 2/1978 | Eichenseer et al. | 536/86 |
| 4,155,773 | 5/1979 | Ferrill, Jr. | 106/309 |

FOREIGN PATENT DOCUMENTS

| | | |
|---|---|---|
| 2556821 | 11/1979 | Fed. Rep. of Germany . |
| 978105 | 12/1964 | United Kingdom . |

*Primary Examiner*—A. Lionel Clingman

[57] ABSTRACT

An aqueous dispersion of colloidal size particles of a water-insoluble, polysaccharide derivative such as ethylcellulose is prepared by grinding the water-insoluble, polysaccharide derivative in the presence of water. A suspending agent is optionally employed to increase grinding efficiency and to form a stable suspension of the colloidal size particles.

11 Claims, No Drawings

PREPARING AN AQUEOUS DISPERSION OF COLLOIDAL SIZE PARTICLES OF A WATER-INSOLUBLE POLYSACCHARIDE DERIVATIVE

BACKGROUND OF THE INVENTION

The present invention relates to a method for reducing the particle size of water-insoluble, polysaccharide derivatives and to aqueous colloidal dispersions of the polysaccharide derivative.

Water-insoluble, polysaccharide derivatives such as the cellulose ethers, e.g., ethyl cellulose and benzyl cellulose, are known to be particularly useful in a wide variety of applications including the preparation of molded articles and as a component in protective coatings and adhesives.

Conventionally, in the preparation of films, coatings or the like, an aqueous suspension of colloidal size particles of the polysaccharide derivative is applied to a suitable substrate and the particles subsequently fused to form the desired film or coating. In general, to prepare films or coatings having desired properties and uniformity, the particles of the polysaccharide derivative exhibit a number average particle size of less than about 100 microns. Therefore, as the polysaccharide derivatives are conventionally prepared as a powder having a relatively large particle size, e.g., number average particle size from about 1 to about 10 mm, they must often be further comminuted prior to use.

Unfortunately, conventional grinding techniques have not been found to effectively comminute the polysaccharide derivatives. Specifically, the polysaccharide derivative must be ground in an oxygen free atmosphere to prevent the possibility of explosion. In addition, the temperature incurred during grinding is often sufficient to prematurely fuse the polysaccharide derivative particles, thereby deleteriously affecting the properties of the ground material. Moreover, to obtain the desired particle size generally requires significant amounts of time and energy.

To reduce the problems associated with possible dust explosions, it has been proposed to dissolve the polysaccharide derivative in an organic liquid and to disperse the resulting solution in water. Thereafter, the organic liquid is evaporated with the resulting product being an aqueous suspension of colloidal size particles of the polysaccharide derivative. Unfortunately, dispersing the organic solution in water and thereafter evaporating the organic liquid requires undesirable amounts of time and energy. In addition, the ground polysaccharide derivative often contains undesirable amounts of residual organic liquid.

Alternatively, as disclosed in U.S. Pat. No. 4,076,935, the particle size of cellulose or a derivative thereof can be reduced by grinding the cellulose or derivative in a vibration mill in the presence of air and sufficient amounts of water to yield a product having a water content from about 2 to 10 weight percent. While this method also reduces the possibility of explosion during the grinding operation, polysaccharide derivatives having a desirably small particle size are not readily obtained without undesirable amounts of the cellulose or the cellulose derivative being fused and/or exhibiting significant viscosity losses during the grinding operation.

Therefore, in view of the stated deficiencies of the prior art methods of comminuting polysaccharide derivatives, it remains highly desirable to provide a method for effectively comminuting polysaccharide derivatives.

SUMMARY OF THE INVENTION

Accordingly, the present invention is a method for reducing the particle size of a water-insoluble, polysaccharide derivative. Said method comprises grinding the water-insoluble, polysaccharide derivative in the presence of sufficient amounts of an aqueous grinding medium to form an aqueous dispersion of the polysaccharide derivative and at conditions such that the polysaccharide derivative is ground to a number average particle size of less than about 10 microns wherein said amounts of the aqueous grinding medium are at least about 20 weight percent based on the weight of the polysaccharide derivative and aqueous grinding medium.

Surprisingly, by employing sufficient amounts of water, a water-insoluble polysaccharide derivative can be effectively ground to a relatively small particle size in a sort time without the ground particles exhibiting substantial fusing or degradation, wherein degradation is measured by the viscosity loss of the polysaccharide. Moreover, the grinding is conducted without the danger of explosion.

The resulting product generally consists of an aqueous suspension of the finely ground particles of the polysaccharide derivative which suspensions are particularly useful in the preparation of films or coatings. In many cases, plasticizers and other modifiers can be added to the suspension and a film or coating prepared directly therefrom without additional processing.

In an embodiment of particular interest, a suspending agent is employed in the practice of the present invention to aid in forming a more uniform dispersion of the polysaccharide derivative. The suspending agent can be added prior to, simultaneous with or subsequent to the grinding of the polysaccharide derivative. When present during grinding, the suspending agent improves the efficiency of the grinding operation.

DETAILED DESCRIPTION OF THE PREFERRED EMBODIMENT

The term "water-insoluble, polysaccharide derivative" is used conventionally herein and refers generally to the water-insoluble derivatives or chemical modifications of a polysaccharide (i.e., a polymer comprised of monosaccharide units linked together by glycosidic bonds). By the term "water-insoluble" is meant that the polysaccharide derivative does not form a true solution in water, i.e., the individual polymer molecules are not dissociated from the bulk of the polymer when immersed in water. Advantageously, the polysaccharide derivative forms less than about a 5, more advantageously less than about a 1, weight percent solution in water. Representative water-insoluble, polysaccharide derivatives include the water-insoluble derivatives of cellulose such as various cellulose ethers including ethyl cellulose or benzyl cellulose and cellulose esters including cellulose acetate, cellulose propionate, cellulose acetate butyrate, cellulose phthalate and cellulose nitrate; the water-insoluble derivatives of starch such as starch xanthate and the like. The method of the present invention is particularly useful for grinding the water-insoluble cellulose ethers and cellulose esters, advantageously ethyl cellulose, preferably those ethyl celluloses having an ethoxyl degree of substitution equal to or greater than about 2.0.

In the practice of this invention, the polysaccharide derivative is ground in the presence of an aqueous liquid (hereinafter referred to as an aqueous grinding medium). The aqueous grinding medium is generally water, an alkaline or acidic aqueous solution such as an aqueous solution of calcium or sodium hydroxide or an aqueous salt solution. Less preferably, mixtures of water and a water-miscible liquid in which the polysaccharide derivative is insoluble such as a polypropylene glycol, e.g., tripropylene glycol, can also be employed as the aqueous grinding medium. If employed, the water-miscible liquid is generally employed in relatively minor amounts. Water is the preferred grinding medium.

The aqueous grinding medium is employed in an amount sufficient to form a dispersion of the polysaccharide derivative which amount is such that, at the grinding conditions employed, the polysaccharide derivative is capable of being ground to a number average particle size of less than about 10 microns. By the term "dispersion of the polysaccharide derivative" is meant a two-phase composition wherein one phase is a continuous phase of the aqueous grinding medium and the other phase is a discontinuous phase of discrete particles of the water-insoluble, polysaccharide derivative. To form a dispersion of the polysaccharide derivative, the aqueous grinding medium is employed in an amount of at least about 20 weight percent based on the total weight of the aqueous grinding medium and polysaccharide derivative. At concentrations exceeding 20 weight percent, the amount of the aqueous grinding medium most advantageously employed will vary depending on a variety of factors including the grinding conditions, the type of polysaccharide derivative and aqueous grinding medium employed and the desired particle size of the ground material. Advantageously, the grinding is conducted in the presence of sufficient amounts of water such that the polysaccharide derivative does not exhibit substantial fusing or degradation during grinding.

As used herein, the term "fusing of the particles of the polysaccharide derivative" refers to the confluence or physical coupling of two or more particles as generally caused by sufficient heat to melt or liquefy at least the surface of the polymer particle. The fusion of the particles of the polysaccharide derivative is easily determined by microscopic evaluation of the ground material and is evidenced by the apparent adherence of two or more individual particles. For the purposes of this invention, the particles are not substantially fused when less than 10 percent, by number, of the ground particles exhibit such fusion. Advantageously, by the method of this invention, less than about 5, more advantageously less than about 1, percent, by number, of the ground particles exhibit such fusion. Preferably, the grinding is conducted in an amount of the aqueous grinding medium and at conditions such that essentially none of the polymer particles exhibits fusion.

For the purposes of this invention, degradation of the polysaccharide derivative is measured by the loss in viscosity of the polysaccharide derivative, i.e., the difference in the viscosity of the polysaccharide derivative following grinding and the original viscosity of the derivative, wherein the viscosities are measured as a dilute solution of the derivative. Such differences are conveniently referred to as the viscosity retained by the polysaccharide derivative during grinding with the viscosity of the ground material being expressed as a percentage of the original viscosity of the polysaccharide derivative. Said viscosities are measured using conventional techniques. For example, the viscosity of a cellulose ether or cellulose ester is often measured as a 5 weight percent solution of the ether or ester in an 80/20 by volume toluene/ethanol mixture using a Ubbelhode viscometer (4.1 mm inside diameter) at 25° C. Advantageously, the viscosity of the ground polymer is at least about 80, preferably at least about 90, percent of its original viscosity. Most preferably, the viscosity of the polysaccharide derivative following grinding is essentially the same as the viscosity of the polysaccharide derivative prior to grinding.

Typically, while the most effective amounts of the aqueous grinding medium are easily determined by experimental techniques set forth herein. The polysaccharide derivative generally does not exhibit substantial fusion or degradation upon grinding when at least about 20 weight percent of the aqueous grinding medium is employed. In general, the aqueous grinding medium is advantageously employed at a concentration of at least about 30, preferably at least about 50, more preferably at least about 70, weight percent based on the weight of the aqueous grinding medium and polysaccharide derivative.

In a preferred embodiment, a suspending agent is employed in the practice of this invention. Suitable suspending agents are those compounds which assist in formation of a more uniform dispersion of the polysaccharide derivative, particularly the ground derivative, in the aqueous grinding medium. In general, the suspending agents advantageously employed herein are anionic, cationic, nonionic or amphoteric suspending agents (surfactants) or mixtures thereof which are soluble in the aqueous grinding medium (i.e., the mixture of the aqueous grinding medium and suspending agent appears as a homogeneous liquid under visual inspection with no magnification). More advantageously, the suspending agent is a soluble nonionic or anionic material, preferably having an HLB value of at least about 4 (wherein HLB is the hydrophilic-lipophilic balance of the suspending agent). Representative anionic suspending agents include the salts of long chain fatty acids such as sodium lauryl sulfate and sodium octyl sulfate, alkyl aryl sulfonates such as sodiumdodecylbenzene sulfonate and alkyl phenoxy polyethylene sulfonates and the like. Representative of such nonionic suspending agents or surfactants include the polyoxyethylene derivatives of fatty acid partial esters of sorbitol anhydrides, e.g., poly(oxyethylene)$_{20}$ sorbitan monolaurate and poly(oxyethylene)$_4$ sorbitan monostearate; the ethoxylated sorbitan esters, e.g., sorbitan monooleate; alkylphenoxypoly(oxyethylene)ethanols, e.g., nonylphenoxypoly(ethyleneoxy)ethanol; and the polyoxyalkylene derivatives of propylene glycol with polyoxyethylene (20) sorbitan monolaurate, polyoxyethylene (20) sorbitan monostearate; nonylphenoxypoly(ethyleneoxy)ethanol and the polyoxyalkylene derivatives of propylene glycol being the preferred nonionic surfactants.

When employed, the suspending agent is employed in an amount sufficient to form a suspension of the polysaccharide derivative in the aqueous grinding medium. By the term "suspension" is meant that the polysaccharide derivative particles are essentially uniformly distributed throughout the dispersing medium. Advantageously, such suspension will be stable, e.g., does not exhibit substantial settling, for an extended period of at least about one week, preferably at least about one month, more preferably at least about two months, when stored in a closed container at ambient temperatures, e.g., from about 18° to about 25° C. Such amount will vary depending on a variety of factors including the type and concentration of both the polysaccharide derivative and the aqueous grinding medium. Typically, an amount of suspending agent from about 1 to about 30, advantageously from about 3 to about 10, weight percent based on the weight of the aqueous grinding medium and polysaccharide derivative forms a sufficiently stable suspension.

In the practice of this invention, the polysaccharide derivative and aqueous grinding medium are mixes and the polysaccharide derivative subsequently ground. To facilitate the preparation of a stable suspension of the polysaccharide derivative, the suspending agent can be added prior to, simultaneous with, or subsequent to the grinding of the polysaccharide derivative. As the suspending agent has also been found to improve the grinding efficiency, the suspending agent, or at least a portion thereof, is preferably present during grinding, i.e., it is admixed with the grinding medium either prior to or simultaneous with grinding. In general, this increased grinding efficiency is evidenced by (1) the number average particle size of the polysaccharide derivative ground in the presence of the surfactant being less than the number average particle size of the polysaccharide derivative ground using identical grinding techniques except no surfactant is employed thereof and/or (2) a measurable reduction in the time required for grinding the polysaccharide derivative to a predetermined particle size. Typically, the amount of suspending agent which will provide such improved grinding efficiency will depend on a variety of factors, including the type and amount of polysaccharide derivative and grinding medium employed. Although lesser amounts of the suspending agent can be employed herein, in general, an amount of suspending agent which is employed in stabilizing the suspension of the ground material is advantageously present during grinding and imparts such grinding characteristics.

Grinding is suitably conducted using techaniques capable of comminuting the polysaccharide derivative dispersed in the aqueous grinding medium. Conventional grinding techniques useful in wet grinding are well known in the art, with reference being made thereto for the purpose of this invention, and are generally advantageously employed herein. For example, both shear type mills, e.g., hammer mills and knife grinders, and impact type mills such as tumbling media mills, e.g., ball, pebble, rod, tube or compartment mills and autogenous mills, can be employed herein. Preferably, the polysaccharide derivative is ground using an impact type mill. More preferably, a tumbling media is employed, with a ball mill being most preferred.

When ground in the presence of sufficient amounts of a suspending agent, the resulting mixture is a stable aqueous suspension of finely divided particles of a water-insoluble polysaccharide derivative having a number average particle size of less than about 10 microns. Alterntively, additional amounts of the suspending agent may be required if insufficient amounts are employed to form a stable suspension during grinding or the suspension is to be stored for long periods prior to use. In either case, the resulting suspension can readily be employed in the preparation of uniform films, coatings or the like without subsequent modifications. In general, in preparing such films or coatings, the aqueous suspension is admixed with various other ingredients which help impart the desired chemical and physical properties to the films or coatings. Such other ingredients and techniques for preparing films, coatings or the like from the aqueous suspensions are well known in the art and reference is made thereto for the purposes of this invention. As an example thereof, a plasticizer such as a glyceride, e.g., glyceryl laurate, is often employed to reduce the heat needed for fusing the particles of the polysaccharide derivative and to give the resulting film or coating the desired flexibility and toughness. Other optionally employed modifiers include pigments, dyes and the like.

The preparation of films, coatings of the like from the aqueous suspension, is carried out using techniques well known in the art for preparing such films or coatings. In general, the suspension is applied to a suitable substrate such as by casting, brushing, spraying or the like and the coating or film subsequently heated to a temperature sufficient to evaporate the aqueous liquid and to fuse the particles of the polysaccharide derivative. In general, temperatures from about 120° to about 140° C. are advantageously employed.

The following example is presented to illustrate the present invention and should not be construed to limit its scope. In the example, all parts and percentages are by weight unless otherwise indicated.

EXAMPLE

A 125 part portion of an ethylcellulose having an ethoxyl degree of substitution of about 2.6 and being in the form of granules having a number average particle size of about 4 mm is admixed with 300 parts of water and 4 parts of a polyoxyalkylene derivative of propylene glycol sold as Pluronic F-38 by BASF Wyandotte. The resulting mixture is placed in a ball mill having a cylindrical shell with an inside diameter of about 10 cm and a height of about 10 cm. The mill is charged with an amount of 25 balls having a number average particle size of about 15 mm sufficient to comprise about 30 percent of the total mill volume. The ethylcellulose is ground for a period of about 16 hours at a mill speed of about 100 rpm. At the end of this period, the mill contains an aqueous suspension of ethylcellulose particles. The suspension is separate from the ball charge. The ethylcellulose particles are found to have a number average particle size of about 2 microns using conventional dissymmetry measurement techniques.

A portion of the resulting suspension is cast on paper to a thickness of about 1 mm. The ethylcellulose particles are subsequently fused and the water evaporated by heating the cast material to a temperature of about 215° C. The fused particles form an exceptionally uniform water-impermeable film.

To a second portion of the resulting suspension is added sufficient amounts of castor oil such that the suspension contains 10 percent castor oil plasticizer based on the total weight of ethylcellulose, water, suspending agent and castor oil. The resulting suspension is subsequently cast on paper to a thickness of about 1 mm. Due to the presence of the castor oil, the particles are fused at the lower temperature of 205° C. to form a water impermeable coating.

What is claimed is:

1. A method for comminuting a water-insoluble, polysaccharide derivative, said method comprising grinding the water-insoluble, polysaccharide derivative in the presence of sufficient amounts of an aqueous grinding medium to form an aqueous dispersion of the polysaccharide derivative and at conditions such that the polysaccharide derivative is ground to a number average particle size of less than about 10 microns, wherein said amount of the grinding medium is at least about 20 weight percent based on the weight of the polysaccharide derivative and aqueous grinding medium.

2. The method of claim 1 wherein the water-insoluble polysaccharide derivative is a water-insoluble derivative of cellulose.

3. The method of claim 2 wherein the water-insoluble derivative is a cellulose ether or a cellulose ester.

4. The method of claim 1 wherein the aqueous grinding medium is water, an alkaline or acidic aqueous solution or an aqueous salt solution.

5. The method of claim 4 wherein the aqueous grinding medium is employed in an amount such that the polysaccharide derivative does not exhibit substantial fusing or degradation during grinding.

6. The method of claim 4 wherein the aqueous grinding medium is employed at a concentration of at least about 30 weight percent based on the weight of the aqueous grinding medium and the polysaccharide derivative.

7. The method of claim 1 wherein the grinding is conducted in the presence of a suspending agent.

8. The method of claim 7 wherein the suspending agent is a nonionic or anionic material having an HLB value of at least about 4.

9. The method of claim 8 wherein the suspending agent is the salt of a long chain fatty acid, an alkyl aryl sulfonate, a polyoxyethylene derivative of a fatty acid partial ester of sorbitol anhydrides, an ethoxylated sorbitan ester, an alkylphenoxypoly(oxyethylene)ethanol or a polyoxyalkylene derivative of propylene glycol.

10. The method of claim 1 wherein cellulose ether or cellulose ester is ground in the presence of water at a concentration of at least about 50 weight percent based on the weight of the water and the cellulose ether or cellulose ester, said grinding being conducted in the presence of a suspending agent.

11. The method of claim 10 wherein the cellulose ether or cellulose ester is ethyl cellulose and the suspending agent is the salt of a long chain fatty acid, polyoxyethylene (20) sorbitan monolaurate, polyoxyethylene (20) sorbitan monostearate, nonylphenoxypoly(ethyleneoxy)ethanol or the polyoxyalkylene derivative of propylene glycol.

* * * * *